G. R. BENNETT.
VEHICLE WHEEL.
APPLICATION FILED JAN. 18, 1910.
1,038,522.
Patented Sept. 17, 1912.
3 SHEETS—SHEET 1.
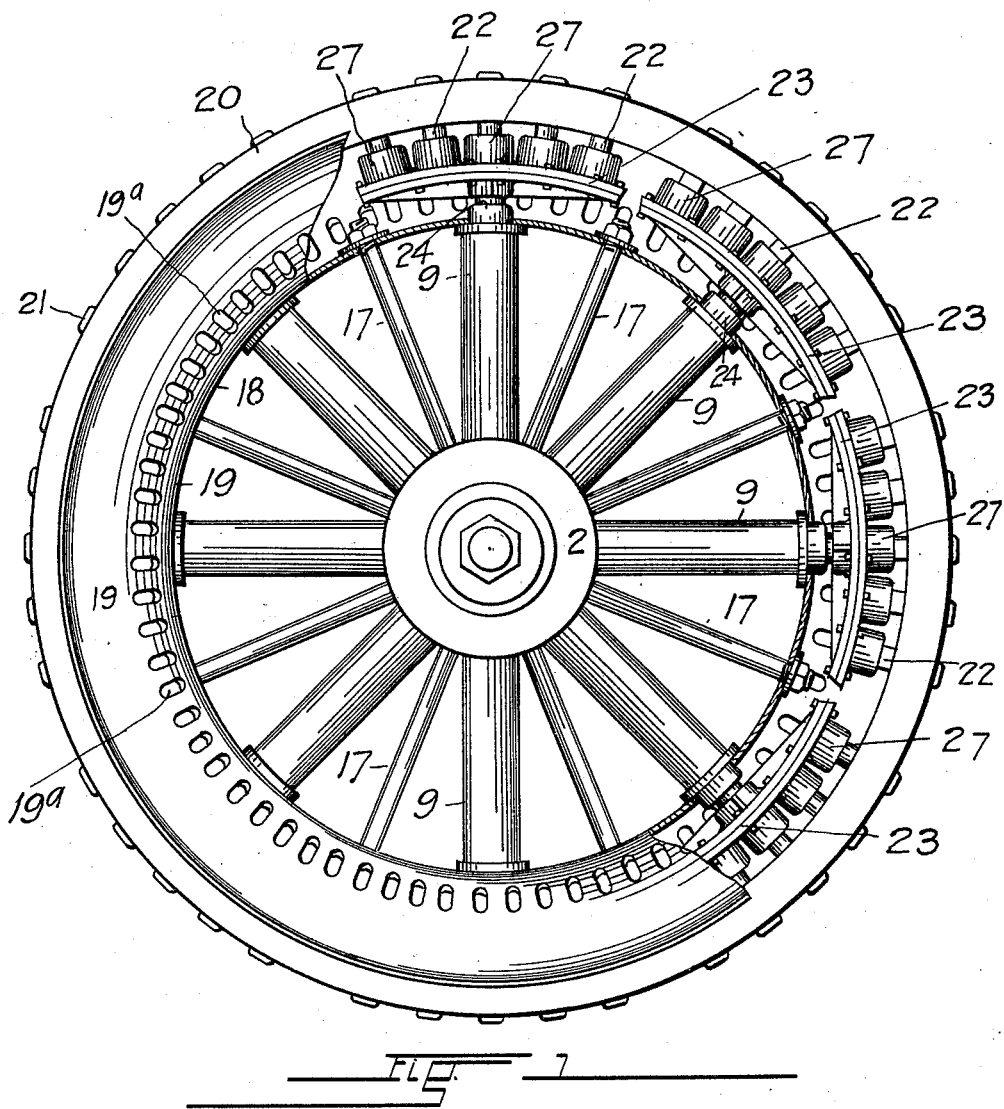
WITNESSES:
M. L. Geary.
F. H. Cuno.
INVENTOR.
G. R. Bennett.
BY
ATTORNEY.

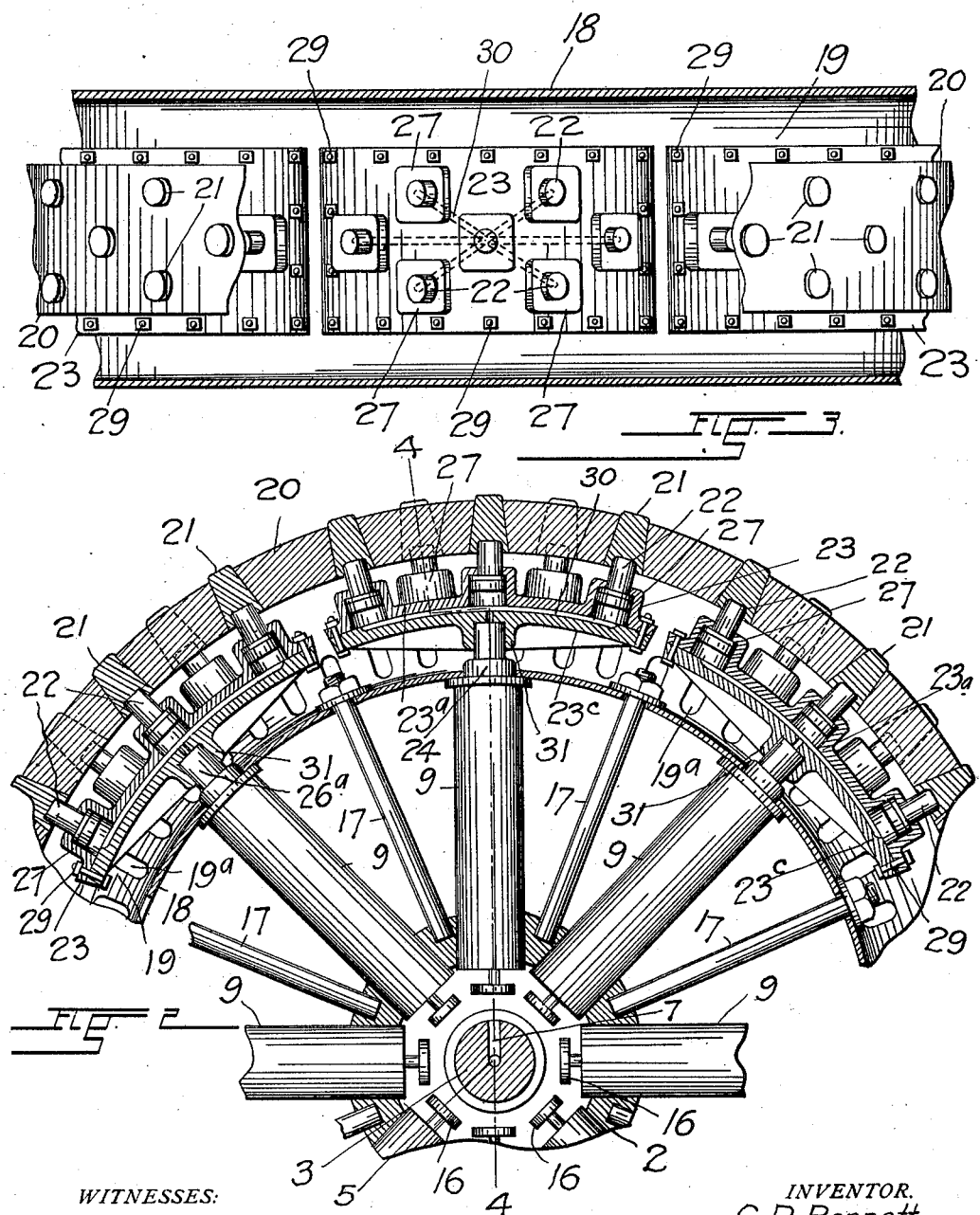

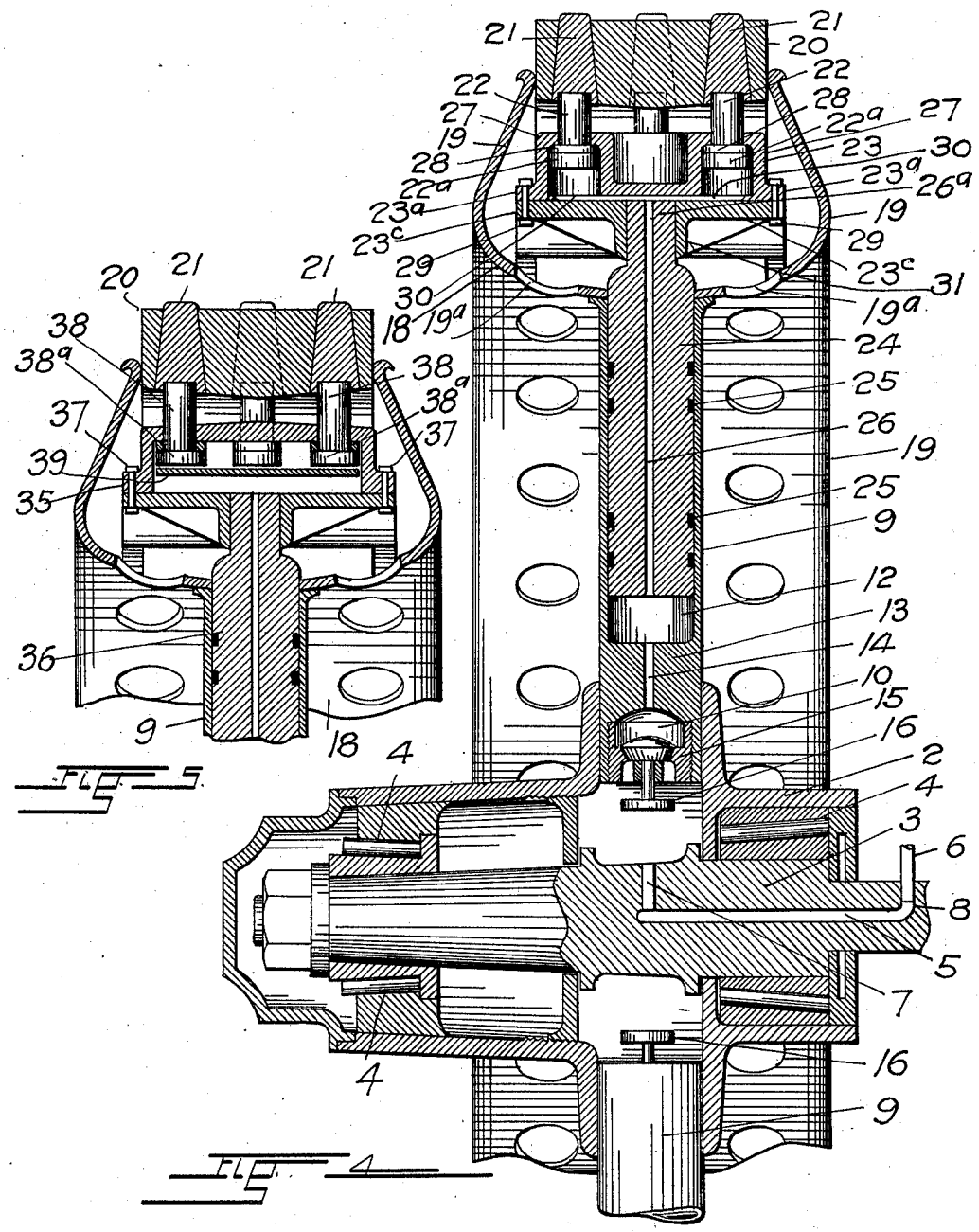

UNITED STATES PATENT OFFICE.

GEORGE R. BENNETT, OF DENVER, COLORADO.

VEHICLE-WHEEL.

1,038,522.  Specification of Letters Patent.  Patented Sept. 17, 1912.

Application filed January 18, 1910. Serial No. 538,767.

*To all whom it may concern:*

Be it known that I, GEORGE R. BENNETT, a citizen of the United States of America, residing at Denver, in the county of Denver and State of Colorado, have invented certain new and useful Improvements in Vehicle-Wheels, of which the following is a specification.

My invention relates to improvements in vehicle wheels and more particularly in wheels of the type employed on motor-driven conveyances.

The object of my invention resides in the provision of a wheel of simple construction in which a solid tire of resilient material is subject to the influence of a body of fluid under compression stored at a point remote therefrom and which, in consequence, possesses all the advantages of the hollow, pneumatic tire, at present commonly used, without having any of its objectionable features such as the liability to punctures, leakage and rapid wear.

My improved wheel consists, briefly, of a hub, a rim and a tire of rubber, leather or other elastic material, which is movably associated with the latter, by connection with a plurality of reciprocating elements adapted to yieldingly maintain the tire in concentric relation to the hub by the pressure of a body of compressed air which is supplied to the wheel, through the said hub, from a conveniently located source.

An embodiment of my invention is shown in the accompanying drawings in the various views of which like parts are similarly designated and in which—

Figure 1, represents an elevation of my improved wheel, part of its rim being broken away to reveal the mechanism inclosed thereby, Fig. 2, a fragmentary, sectional elevation of the wheel, drawn to an enlarged scale, Fig. 3, a top view of the construction shown in Fig. 2 with the wheel rim in section, Fig. 4, a section taken along the line 4—4 Fig. 2, drawn to an enlarged scale, and Fig. 5, a similar view showing a modified form of construction.

Referring to the drawings by numerical reference characters, let the numeral 2 designate a hollow hub which is revolubly mounted on the tapering extremity of a stationary axle 3 through the instrumentality of roller bearings 4. The axle 3 is provided with a longitudinally extending, interior air duct 5, whose extremities connect, respectively, with the interior of the hub and with a conduit 6 leading to the source of air supply, by means of transverse passages 7 and 8. The source above referred to, may consist of a reservoir disposed on the vehicle or of a pump operatively associated with a rotary element thereof, and has for obvious reasons, been omitted from the drawings. Projecting radially from the hub 3, are a plurality of cylindrical spokes 9, the interior of each of which is divided into a valve chamber 10 and a plunger chamber 12, by an intermediate partition 13. The two chambers 10 and 12 communicate by means of a bore 14 in the partition 13, and the valve chamber 10 is interiorly threaded for the reception of an apertured plug 15 which provides a seat for a check valve 16 which, normally, separates the interior of the valve chamber from that of the hub.

Radiating from the hub in alternate relation to the cylindrical members 9, are a plurality of solid spokes 17 which, in conjunction with the latter, support an annular wheel-rim 18 formed with convergent sides 19 between the edges of which the tire 20 is movably disposed. This tire, the major portion of which projects normally beyond the edges of the rim-sides 19, consists of a solid annulus composed of rubber, leather or other elastic material and studded with a multiplicity of tapering plugs 21 which project through uniformly arranged, correspondingly shaped openings in the tire and preferably beyond the peripheral surface thereof. The inner extremities of the plugs 21 which are flush with the interior surface of the tire, are formed with depressions for the reception of the correspondingly shaped ends of small pistons 22 which are longitudinally movably associated with heads 23, secured upon the protruding extremities of plungers 24 which are fitted in the plunger chambers 12 of the several cylindrical spokes 9. In the construction shown in the drawings, the wheel has in conjunction with the hub and the surrounding rim, eight hollow and an equal number of solid spokes and each of the former is provided with an independently movable plunger 24 separately connected with a head 23 which carries seven of the small pistons 22 which, as will hereinafter be explained, are independently movable. It will thus be observed that the tire is connected with the wheel at fifty-six uniformly distributed, separate points which figure, it will be understood is entirely arbitrary and may be changed in accordance with the diameter of the wheel, the degree of elasticity of the material of which the tire is composed or other conditions.

Each of the plungers 24 is equipped with packing rings 25 for the usual purpose and is formed with an axial bore 26 which in the operation of the invention, connects the interior of the chamber 12 with that of the corresponding head 23. The latter is composed of two parts 23$^a$ and 23$^c$ the outer one, 23$^a$, of which consists of a plate formed with outwardly projecting bosses 27 bored for the reception of heads 22$^a$ on the pistons 22 whose stems or body portions protrude through openings of reduced diameter in the faces of the said bosses and project into the recesses of the plugs 21 as hereinbefore described. Washers 28 of elastic material placed around the pistons contiguous to their heads 22$^a$, serve to imperviously close the openings through which their body portions project when the plungers are in their normal position. The inner members 23$^c$ of the heads 23, which are secured to the outer parts by means of marginally arranged bolts 29, consist of a plate formed with a plurality of grooves 30 which, when the two members are assembled, connect the bores of the various bosses 27 with the interior of a centrally disposed sleeve 31 into which the reduced extremity 26$^a$ of the respective plunger 24 is fitted.

The lower surface of the tire 20 is tapered from a central line outwardly, to oppose the accumulation of mud between it and the upper surfaces of the heads 23 and the rim 18 has in its innermost portion a series of openings 19$^a$ through which dirt which entered its interior while the wheel is in motion, may be discharged.

Having thus described the mechanical construction of my improved wheel, its operation will be readily understood. Air under compression which, as stated hereinbefore, may be supplied from a reservoir placed on the vehicle or, in case the wheels serve to support a motor-driven conveyance, from a pump connected with an operative member thereof, is introduced through the conduit 6 and the therewith connected passages 8, 5 and 7 in the axle 3, into the hollow hub 2, whence it flows through the valve-chambers 10 and the bores 14 in the partitions 13 of the various cylindrical spokes 9, into the plunger chambers 12 and thence, through the axial bores 26 in the plungers 24 and the therewith communicating grooves 30 into the interiors of the various bosses 27 of the several heads 23. The compressed fluid being thus distributed, acts uniformly upon the various pistons 22, which when in their normal position, maintain the tire 20 in concentric relation to the hub 3, while they permit the same to flex at any portion, when, while the vehicle is in motion, the wheel of which it forms part, encounters an unevenness or obstruction on the surface over which it is propelled. Light shocks produced at any portion of the tire will thus be absorbed by the movement of the pistons 22 against the pressure of the fluid, while more violent concussions are deadened by the additional movement of the plungers 24 in the hollow spokes 9. If by leakage or breakage, the pressure of the fluid introduced into the hollow hub is diminished, the check-valve 10 will effectively confine the air contained in the various heads and thereby prevent sudden collapse of the tire by decrease in density of the fluid body acting upon the plungers 24 and the pistons 22.

To increase the wearing qualities of the tire and to, at the same time, oppose skidding, the extremities of the plugs 21 may project beyond the circumferential surface of the tire as is shown in the drawings. It will be understood however, that this feature of the construction is not essential.

In the modified construction illustrated in Fig. 5 of the drawings, the head 35 connected with the plunger 36, is composed of two parts which when fastened together by the marginal bolts 37 provide one chamber into which the heads 38$^a$ of all the pistons 38 extend. A plate 39 movably fitted in this chamber below the heads of the pistons, serves to distribute the pressure exerted by any one of them over the entire body of fluid contained in the head.

Having thus described my invention what I claim and desire to secure by Letters Patent is:—

1. A vehicle wheel comprising a hub, a flexible tire, metal plugs radially secured therein and having depressions in their inner ends, and a multiplicity of reciprocating pistons independently under fluid pressure, concentrically arranged relative to the said hub and respectively projecting into the said depressions.

2. In a vehicle wheel, a hollow hub, means for introducing motive fluid thereinto, a plurality of concentrically arranged heads, radially movably connected with the said hub in communication with the interior thereof, pistons reciprocatingly fitted in the said heads and projecting beyond the circumferential surfaces thereof, and a flexible tire connected with the said pistons.

3. In a vehicle wheel, a hollow hub, means for introducing motive fluid thereinto, a plurality of concentrically arranged heads radially movably connected with the said hub, and each having a plurality of bores separately communicating with the interior thereof, pistons fitted for reciprocation in the respective bores and protruding beyond the circumferential surfaces of the said heads, and a flexible tire connected with the said pistons.

4. In a vehicle wheel, a hollow hub, means for introducing motive fluid thereinto, hollow spokes radiating from the said hub in communication with its interior, plungers fitted for reciprocation in the said spokes, heads associated with the said plungers, in concentric relation to the hub and interiorly in communication with the interior thereof, pistons fitted for reciprocation in the said heads and projecting beyond the circumferential surfaces thereof, check valves adapted to automatically control the flow of fluid from the interior of the hub into the said spokes, and a flexible tire connected with the said pistons.

5. In a vehicle wheel, a hollow hub, means for introducing motive fluid thereinto, hollow spokes radiating from the said hub in communication with its interior, plungers fitted for reciprocation in the said spokes, heads associated with the said plungers in concentric relation to the hub, each of the said plungers having a bore connecting the interior of its head with that of the respective spoke, pistons fitted for reciprocation in the said heads and projecting beyond the circumferential surfaces thereof, and a flexible tire connected with the said pistons.

6. In a vehicle wheel, a hollow hub, means for introducing motive fluid thereinto, hollow spokes radiating from the said hub in communication with its interior, plungers fitted for reciprocation in the said spokes, heads associated with the said plungers, in concentric relation to the hub and interiorly in communication with the interior thereof, pistons fitted for reciprocation in the said heads and projecting beyond the circumferential surfaces thereof a rim connected with the said spokes and a flexible tire held against lateral displacement on the said rim, projecting beyond the circumferential portion thereof and connected with the said pistons.

7. In a vehicle wheel, a hollow hub, means for introducing motive fluid thereinto, hollow spokes radiating from the said hub, their interiors being divided by an apertured partition, into a plunger chamber and a therewith communicating valve chamber, check valves in the various valve-chambers to control the flow of fluid thereinto from the interior of the hub, plungers fitted for reciprocation in the said plunger chambers, heads connected with the said plungers in concentric arrangement relative to the said hub, the said plungers having bores connecting the interiors of their heads with those of the respective spokes, pistons fitted for reciprocation in the said heads and projecting beyond the circumferential surfaces thereof, and a flexible tire connected with the said pistons.

8. In a vehicle wheel, a hollow hub, means for introducing motive fluid thereinto, hollow spokes radiating from the said hub, their interiors being divided by an apertured partition into a plunger chamber and a therewith communicating valve chamber, check valves in the various valve-chambers to control the flow of fluid thereinto from the interior of the hub, plungers fitted for reciprocation in the said plunger chambers, heads connected with the said plungers in concentric arrangement relative to the said hub and each provided with a plurality of bores, each of the said plungers having a longitudinal passage connected separately with each of the bores of its head and with the interior of the respective spoke, pistons fitted for reciprocation in the said bores and projecting beyond the circumferential surfaces of the heads, and a flexible tire connected with the said pistons.

9. A vehicle wheel comprising radially movable members under fluid pressure, a plurality of pistons under fluid pressure, associated with each of said members and a flexible tire mounted upon said pistons.

10. In a vehicle wheel, a circular rim, a plurality of radially movable pistons under fluid pressure, extending beyond the circumferential surface thereof, a flexible tire spaced from said surface and plugs secured in said tire and having depressions occupied by the outer ends of said pistons.

11. In a vehicle wheel, a circular rim, a plurality of radially movable pistons under fluid pressure extending beyond the circumferential surface thereof, a flexible tire spaced from said surface and metal plugs secured in said tire and loosely connected with the respective pistons so as to be held thereby against lateral displacement.

In testimony whereof I have affixed my signature in presence of two witnesses.

GEORGE R. BENNETT.

Witnesses:
G. J. ROLLAUDET,
M. L. GEARY.

---

Copies of this patent may be obtained for five cents each, by addressing the "Commissioner of Patents, Washington, D. C."